US009080621B2

(12) United States Patent
Braford, Jr.

(10) Patent No.: US 9,080,621 B2
(45) Date of Patent: Jul. 14, 2015

(54) FREEWHEELING SYNCHRONIZER

(75) Inventor: Thomas E. Braford, Jr., Brighton, MI (US)

(73) Assignee: BorgWarner Inc., Auburn Hills, MI (US)

(*) Notice: Subject to any disclaimer, the term of this patent is extended or adjusted under 35 U.S.C. 154(b) by 488 days.

(21) Appl. No.: 13/392,894

(22) PCT Filed: Sep. 4, 2009

(86) PCT No.: PCT/US2009/056035
§ 371 (c)(1),
(2), (4) Date: Jun. 11, 2012

(87) PCT Pub. No.: WO2011/028209
PCT Pub. Date: Mar. 10, 2011

(65) Prior Publication Data

US 2012/0241276 A1 Sep. 27, 2012

(51) Int. Cl.

*F16H 3/08* (2006.01)
*F16D 41/12* (2006.01)
*F16D 23/06* (2006.01)
*F16D 47/04* (2006.01)
*F16H 3/10* (2006.01)
*F16H 61/688* (2006.01)

(52) U.S. Cl.
CPC ................ *F16D 41/12* (2013.01); *F16D 23/06* (2013.01); *F16D 47/04* (2013.01); *F16D 2023/0618* (2013.01); *F16H 3/10* (2013.01); *F16H 61/688* (2013.01); *Y10T 74/19228* (2015.01)

(58) Field of Classification Search
CPC ..................................................... F16H 61/688
USPC ........... 74/330, 333; 192/46, 48.8, 53.1, 53.3, 192/108
See application file for complete search history.

(56) References Cited

U.S. PATENT DOCUMENTS 2,450,056 A * 9/1948 Peterson et al. ................ 74/333
4,566,568 A * 1/1986 Yant ......................... 192/53.341
5,105,674 A 4/1992 Rea et al.
5,178,250 A 1/1993 Ashikawa et al.
5,269,400 A * 12/1993 Fogelberg .................. 192/53.34
6,619,151 B2 * 9/2003 Shioiri ............................ 74/333
6,745,881 B1 * 6/2004 Kremer ........................... 192/46
7,219,571 B2 5/2007 McCrary (Continued)

FOREIGN PATENT DOCUMENTS

DE 37 21 214 * 1/1989
JP S5773263 A 5/1982

(Continued)

OTHER PUBLICATIONS

Chinese Office Action dated Oct. 10, 2013; Applicant: BorgWarner Inc.; Application No. 200980161039.9; 18 pages.

(Continued)

*Primary Examiner* — William C Joyce
(74) *Attorney, Agent, or Firm* — BrooksGroup

(57) ABSTRACT

A freewheeling synchronizer for a power transmission device includes a clutch race rotationally fixable to a component of the power transmission device, and a synchronizer hub disposed radially outwardly of the clutch race and unidirectionally rotatable relative to the clutch race. The clutch race and synchronizer hub are freewheelable relative to one another.

2 Claims, 2 Drawing Sheets

10
G1
G3
S
10
T

(56) References Cited

U.S. PATENT DOCUMENTS

| | | | | |
|---|---|---|---|---|
| 7,319,571 | B2 | 1/2008 | Xu et al. | |
| 7,428,854 | B2 * | 9/2008 | Moore et al. | 74/339 |
| 2002/0014131 | A1 | 2/2002 | Shioiri | |
| 2004/0112703 | A1 | 6/2004 | Kremer | |
| 2005/0101432 | A1 | 5/2005 | Pels et al. | |

FOREIGN PATENT DOCUMENTS

| | | | |
|---|---|---|---|
| JP | S599338 | A | 1/1984 |
| JP | 2002048198 | A | 2/2002 |

OTHER PUBLICATIONS

International Search Report and Written Opinion ; date of mailing Jun. 3, 2010; for International Application No. PCT/US2009/056035 ; 11 pages.

Chinese Office Action dated May 29, 2014 ; Application No. 200980161039.9 ; Applicant: Borg Warner Inc. ; 18 pages.

Chinese Office Action dated Dec. 15, 2014 ; Application No. 200980161039.9 ; Applicant : BorgWarner Inc. ; 7 pages.

* cited by examiner

FREEWHEELING SYNCHRONIZER

TECHNICAL FIELD

The field to which the disclosure generally relates to includes mechanical power transmission devices and related components.

BACKGROUND

Some types of mechanical power transmission devices include synchronizers to couple one rotatable component to another. For example, an automotive dual-clutch transmission typically includes two input shafts that receive power input from an engine flywheel via two input clutches, which selectively couple the flywheel to one or the other of the two input shafts. The two input shafts are coupled to a counter shaft via various pairs of meshed gears carried by the shafts.

At any given moment, the dual-clutch transmission conveys power in a synchronous fashion, wherein only one of the two input clutches is fully applied to couple the engine flywheel to only one of the two input shafts. Accordingly, power flows from the flywheel through only one fully applied clutch and its corresponding input shaft, and through only one of the pairs of meshed gears. The one input shaft is selected by applying its respective input clutch, and the one pair of meshed gears is selected with a synchronizer to couple one or the other of the pair of meshed gears to its respective shaft.

BRIEF SUMMARY

According to one illustrative embodiment, a freewheeling synchronizer for a power transmission device includes a clutch race rotationally fixable to a component of the power transmission device, and a synchronizer hub disposed radially outwardly of the clutch race and unidirectionally rotatable relative to the clutch race. The clutch race and synchronizer hub are freewheelable relative to one another.

According to another illustrative embodiment, a power transmission device includes a shaft, a gear freely rotatable on the shaft, and a freewheeling synchronizer having a clutch race coupled to the shaft, a synchronizer hub selectively connectable to the gear, and at least one unidirectional clutching element disposed between the clutch race and the synchronizer hub.

According to a further illustrative embodiment, a dual-clutch transmission includes a first input shaft coupled to a first input clutch, a second input shaft coupled to a second input clutch, and an input gear coupled to the first input shaft. A counter shaft is offset from the input shafts, and a counter shaft gear is freely rotatable on the counter shaft and in constant mesh with the input gear. The transmission further includes a freewheeling synchronizer including a clutch race coupled to the counter shaft, a synchronizer hub selectively connectable to the counter shaft gear, and at least one unidirectional clutching element disposed between the clutch race and the synchronizer hub. The counter shaft and clutch race are freewheelable relative to the synchronizer hub during a transmission upshift to allow both input clutches to be simultaneously fully applied.

Other illustrative embodiments will become apparent from the detailed description provided hereinafter. It should be understood that the detailed description and specific examples, while disclosing illustrative embodiments of the disclosure, are intended for purposes of illustration only and are not intended to limit the scope of the invention.

BRIEF DESCRIPTION OF THE DRAWINGS

Illustrative embodiments of the invention will become more fully understood from the detailed description and the accompanying drawings, wherein.

DETAILED DESCRIPTION OF ILLUSTRATIVE EMBODIMENTS

The following description of the embodiments is merely illustrative in nature and is in no way intended to limit the invention, its application, or uses.

In general, the present disclosure includes a synchronizer having freewheeling clutch functionality, for example, to enable non-synchronous or overlapping application of dual clutches in a dual-clutch type of layshaft transmission. Those skilled in the art will recognize that such a freewheeling synchronizer can be applied in any other type of transmission, or any other suitable power transmission device where it is desired to selectively rotatably couple one component to another using a synchronizer. For example, the freewheeling synchronizer of the present disclosure may be used with an automatic transmission, manual transmission, continuously variable transmission, hybrid or electric motorized transmission, automotive transfer case, or the like.

As used herein, the term synchronizer includes a device to gradually equalize speed, or achieve common rotation, of two rotatable components before the components are positively coupled to one another by the synchronizer. As also used herein, the terminology freewheeling clutch is synonymous with overrunning clutch and one-way clutch, and includes a device that disengages a drive component from a driven component when the driven component rotates faster than the drive component.

Figure 4:
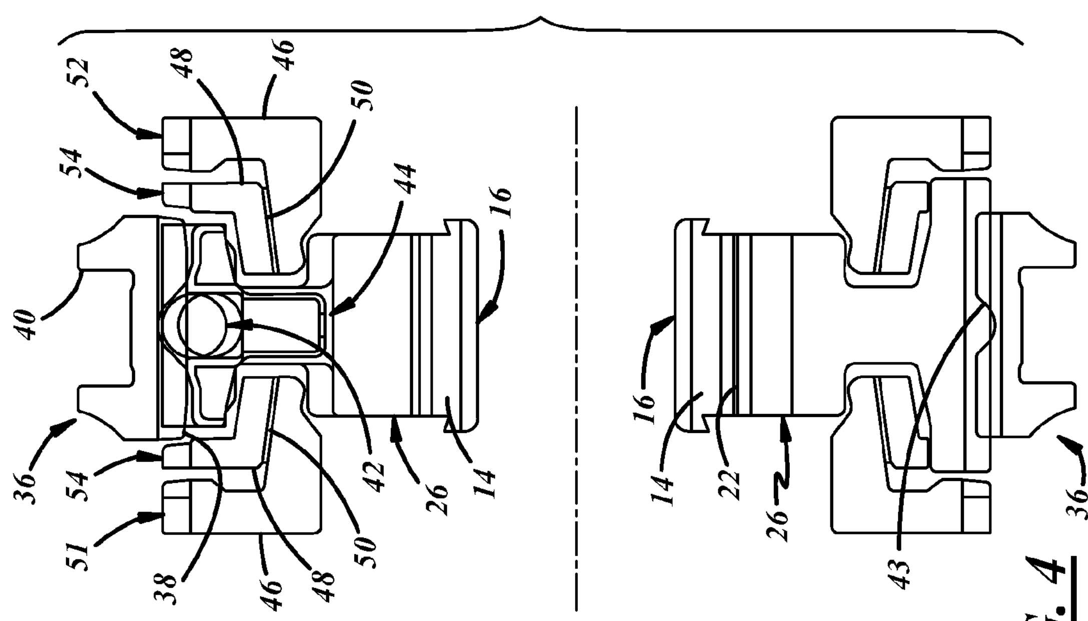
FIG. 4 is an enlarged view of the synchronizer of FIG. 1.
Figure 1:
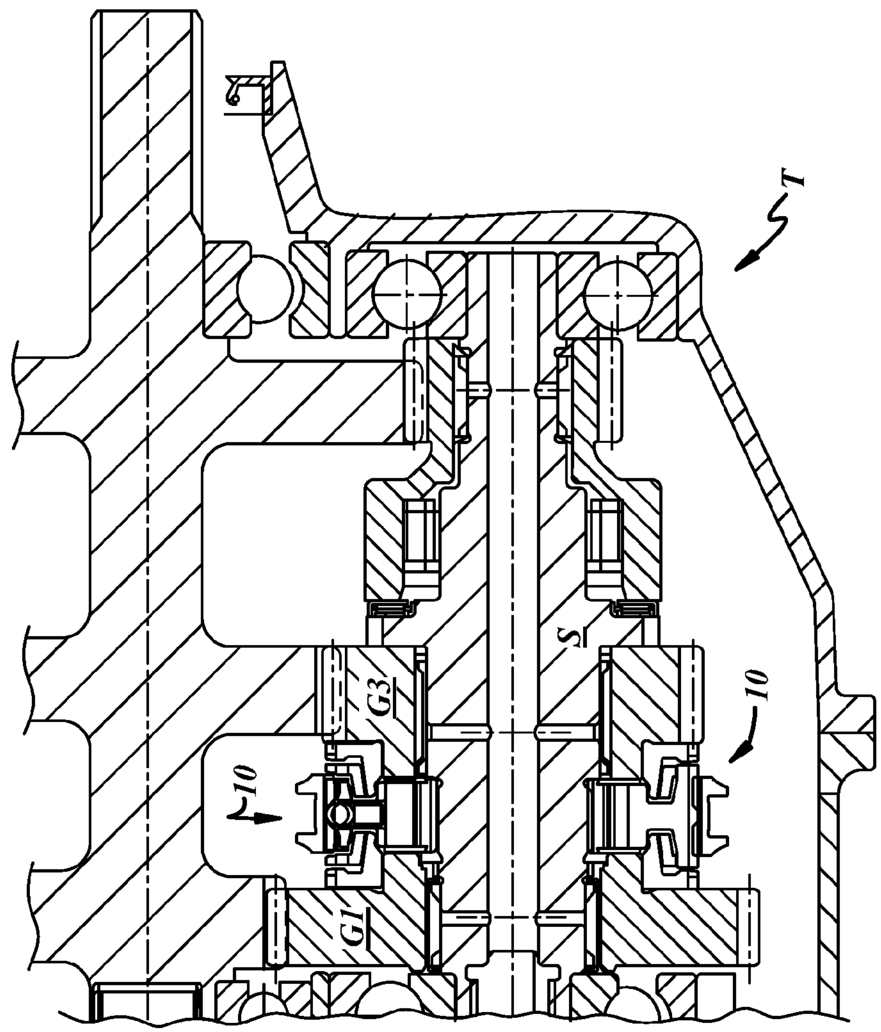
FIG. 1 is a fragmentary cross-sectional view of an illustrative power transmission device including an illustrative freewheeling synchronizer.
Figure 2:
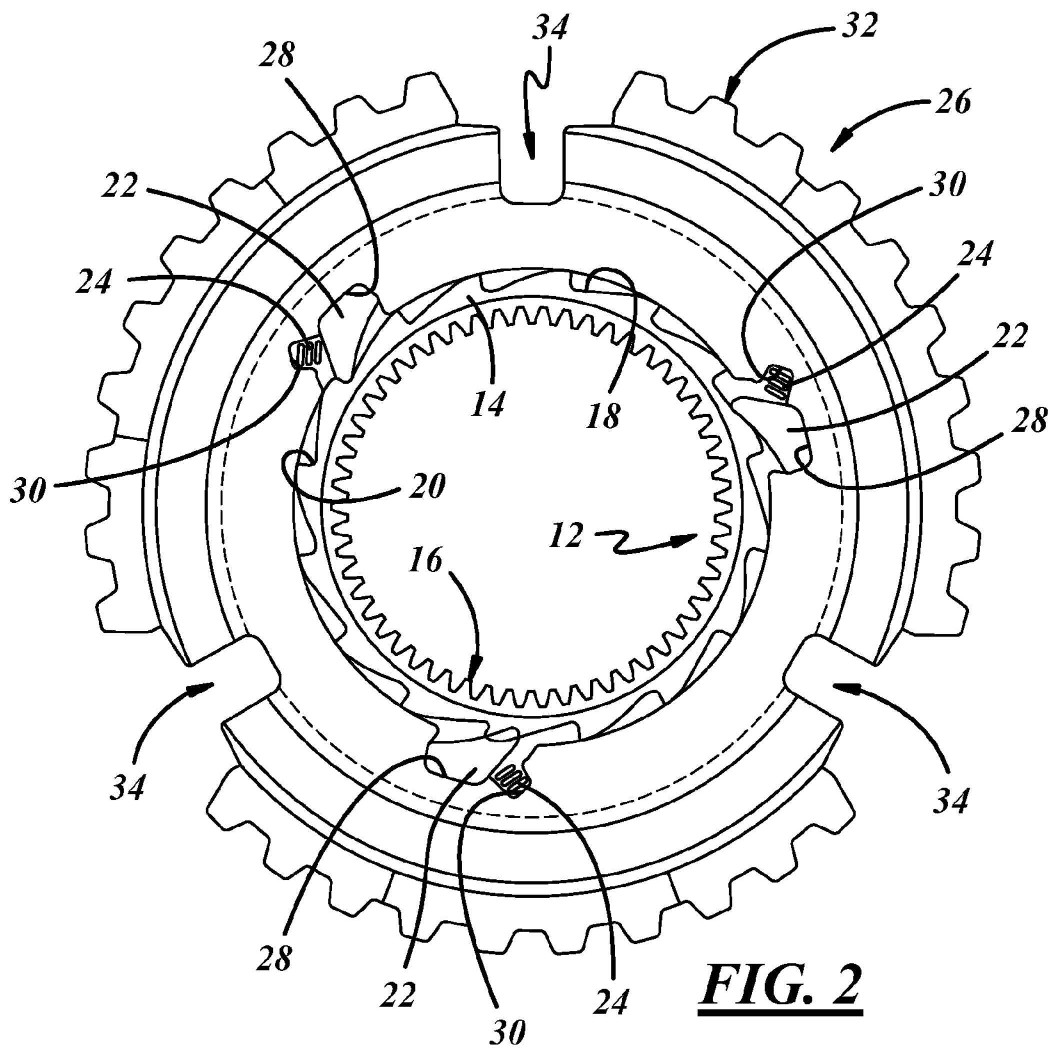
FIG. 2 is an end view of a portion of the freewheeling synchronizer of FIG. 1.

Referring now to FIG. 1, an illustrative freewheeling synchronizer 10 is illustrated in conjunction with a portion of an illustrative dual-clutch transmission T having a counter shaft S and gears G1, G3. As shown in FIG. 2, the freewheeling synchronizer 10 includes an integrated freewheeling clutch 12. The freewheeling clutch 12 may include a clutch race 14 that may include an inner spline diameter 16 for positive coupling to corresponding splines of another component, for example, the input shaft S (FIG. 1) and may also include an outer ratchet diameter 18 defining a plurality of notches 20. The freewheeling clutch 12 may also include one or more unidirectional clutching elements, for example, pawls 22 for engagement with the notches 20 of the clutch race 14 and corresponding springs 24 for urging the pawls 22 into such engagement. The freewheeling clutch 12 may further include a portion of a synchronizer hub 26 disposed radially outwardly of the clutch race 14 and unidirectionally rotatable with respect thereto. The synchronizer hub 26 may include pawl pockets 28 for housing the pawls 22 and spring recesses 30 for housing the springs 24. An illustrative freewheeling clutch is described and illustrated in U.S. Pat. No. 6,745,881, which is assigned to the assignee hereof and is hereby incorporated by reference herein in its entirety in accordance with the teachings herein.

Figure 3:
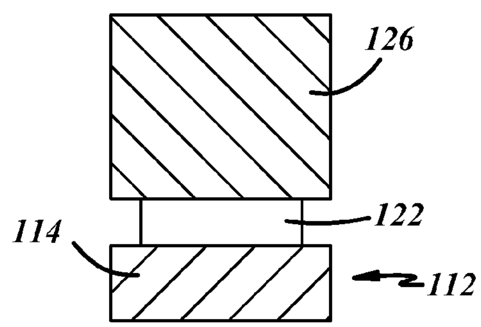
FIG. 3 is a diagrammatic view of a portion of another illustrative freewheeling synchronizer.

Although the illustrated freewheeling clutch 12 is a pawl-and-ratchet driving mechanism, any suitable type of freewheeling clutch mechanism may be used. For example, as shown in FIG. 3, a generic freewheeling clutch 112 may include a clutch race 114, a synchronizer hub 126, and any suitable type of unidirectional clutching element(s) 122 therebetween. For example, the element(s) 122 may include pivoted pawls, slidable pawls, balls or rollers, wedging pawls or blocks, two-point grippers, springs, cams, sprags, or other like devices as well as related components, for example, springs, cages, guides, or the like.

In addition to the freewheeling clutch 12, the freewheeling synchronizer 10 may also include the rest of the synchronizer hub 26, which may also include an axially splined outer diameter 32, and strut pockets 34 radially disposed therein. The freewheeling synchronizer 10 may further include an axially movable sleeve 36 including an axially splined inner diameter 38 for slidable splined engagement with the splined outer diameter 32 of the hub 26, and a circumferentially grooved outer diameter 40 to accept a shift fork (not shown) to axially move the sleeve 36. Gear selection may be performed by an actuator (not shown) that moves the shift fork to move the sleeve 36 of the freewheeling synchronizer 10. The freewheeling synchronizer 10 may also include a detent mechanism, which may include a ring spring 42 carried between the hub 26 and the sleeve 36 for yieldable engagement with a spring groove 43 of the sleeve 36. The freewheeling synchronizer 10 may also include reaction rings 46 fixed to the respective gears G1, G3, blocker rings 48 positioned between the reaction rings 46 and the hub 26 and sleeve 36, and friction material 50 carried between corresponding conical surfaces of the rings 46, 48. One illustrative synchronizer is described and illustrated in U.S. Pat. No. 5,269,400, which is assigned to the assignee hereof and is hereby incorporated by reference herein in its entirety in accordance with the teachings herein.

Like the hub 26, the reaction and blocker rings 46, 48 include splined outer diameters 52, 54 adapted for cooperation with the splined inner diameter 38 of the sleeve 36 when the sleeve 36 is axially moved. But before the splined diameters 38, 52, 54 can engage, axial movement of the sleeve 36 initiates frictional contact between corresponding conical surfaces of the reaction and blocker rings 46, 48 to bring the speeds of the gear G1 or G3 and shaft S together. For example, struts 44 may be disposed in the strut pockets 34 for axial engagement of the blocker rings 48 upon axial movement of the sleeve 36. Once the speeds are substantially synchronized, the sleeve 36 can pass over the blocker and reaction rings 48, 46. Accordingly, the sleeve splined inner diameter 38 interengages the ring splined outer diameters 54, 52, while still being partially engaged with the hub splined outer diameter 32, so as to positively couple the shaft S to the gear G1 or G3 through the freewheeling synchronizer 10.

The freewheeling clutch 12 may lock the rest of the freewheeling synchronizer 10 to the shaft S in one rotational direction, and may permit freewheeling of the freewheeling synchronizer 10 relative to the shaft S and vice-versa. More specifically, the freewheeling clutch 12 may enable the clutch race 16 and synchronizer hub 26 to be freewheelable relative to one another. In other words, using the freewheeling clutch 12, the shaft S may rotate faster than the hub 26 of the freewheeling synchronizer 10, for example, to permit the freewheeling synchronizer 10 to remain engaged to its respective gear G1 or G3 while some other synchronizer (not shown) is engaged to some other gear (not shown) to increase the speed of the shaft S.

In locked operation, rotation of the gear G1 or G3 is transmitted through the splined diameter 52 of the reaction ring 46, through the splined sleeve 36, through the splined synchronizer hub 26, through the pawl(s) 22, through the splined clutch race 14, and into the splined shaft S. In freewheeling operation, the shaft S and clutch race 14 may rotate faster than the hub 26 such that the pawls 22 come out of engagement with the notches 20 of the clutch race 14. Accordingly, a respective one of the dual input clutches (not shown) associated with the freewheeling synchronizer 10 and gear G1 or G3 does not slip and its load is automatically released or at least reduced when the shaft S rotates faster than the synchronizer hub 26.

Generally, a multiple input clutch transmission may receive power input from an engine flywheel through multiple input clutches coupled respectively to multiple input shafts. For example, a dual-clutch transmission may include two input clutches that receive power from a flywheel and may include two input shafts coupled to a lay shaft or counter shaft with several pairs of meshed gears therebetween. One illustrative dual-clutch transmission is described and illustrated in U.S. Pat. No. 7,219,571, which is assigned to the assignee hereof and is hereby incorporated by reference herein in its entirety in accordance with the teachings herein.

The dual-clutch transmission multiplies the received power between one or the other of the two input shafts and the counter shaft using one of the pairs of meshed gears therebetween at any given moment. The dual-clutch transmission may transmit the multiplied power from the counter shaft to an output shaft, which may be coupled to some downstream device like a vehicle axle.

Each input shaft carries different gears thereon in either a fixed manner, or in a selectively fixable manner. In one example, the first input shaft may carry odd gears and the second input shaft may carry even gears.

More particularly, in a 6-speed dual-clutch transmission one input shaft may include forward gears 1, 3, and 5, and the other input shaft may include forward gears 2, 4, and 6 as well as a reverse gear.

Similar to the input shafts, the counter shaft may carry different fixed and/or selectively fixable gears for meshed engagement with the corresponding input shaft gears on the input shafts. Accordingly, the transmission includes several different pairs of meshed gears between the input shafts and the counter shaft to define different gear ratios.

The synchronizers are carried on the input shafts and/or counter shaft next to respective gears so that the synchronizers can selectively fix a selectively fixable gear to its respective shaft. The synchronizers ensure that the rotational speed of the selected gear closely matches that of its respective shaft to enable smooth gear ratio shifting amongst the different pairs of meshed gears.

Uniquely, the synchronizers are carried on their respective shafts in such a manner so that they can freewheel in one direction about the shafts. This configuration enables particularly good shift feel and shift timing by enabling smooth release of an off-going one of the input clutches as the other, on-coming input clutch gains torque capacity and engages. In other words, the off-going input clutch need not be entirely disengaged when the oncoming input clutch becomes fully engaged.

In fact, both input clutches may be simultaneously fully engaged. In a specific example, the synchronizers may be arranged such that when the first input clutch is transmitting power, the power path of the second input clutch is free to permit synchronous selection of a gear of different gear ratio. Then, by gradually disengaging the first input clutch and gradually engaging the second input clutch, the power path is changed from the first input shaft to the second input shaft and through the selected gear.

With reference to FIG. 1 of the incorporated U.S. Pat. No. 7,319,571, the freewheeling synchronizer 10 may be substituted for the synchronizers 74, 76, 78, 80 disclosed therein. For example, the freewheeling synchronizer 10 may be substituted for the synchronizers 78, 80 on the counter shaft 18 so that the counter shaft 18 may freewheel with respect to the freewheeling synchronizer hubs 26.

For instance, if the freewheeling synchronizer 10 is substituted for first/third gear synchronizer 78, the resulting synchronizer 10/78 as well as the first input clutch 32 may remain engaged during and even after an upshift from first gear to second gear. In this scenario, when the reverse/second gear synchronizer 80 becomes engaged to its selectable second gear 54, the counter shaft 18 will increase in speed and will freewheel with respect to the engaged freewheeling synchronizer 10/78.

Similarly, if the freewheeling synchronizer 10 is substituted for reverse/second gear synchronizer 80, the resulting synchronizer 10/80 as well as the second input clutch 34 may remain engaged during and even after an upshift from second gear to third gear. In this scenario, when the third/fifth gear synchronizer 76 becomes engaged to its selectable third gear 42, the counter shaft 18 will increase in speed and will freewheel with respect to the engaged freewheeling synchronizer 10/80.

Accordingly, the counter shaft 18 and clutch races 14 of the synchronizers 10/78, 10/80 are freewheelable relative to the synchronizer hubs 26 thereof during a transmission upshift to allow both input clutches to be simultaneously fully applied. Therefore, the engagement and disengagement of the input clutches need not be synchronized to achieve an upshift. Rather, both input clutches may be fully applied for an overlapping period of time.

The freewheeling synchronizer 10 also may be substituted for the synchronizers 74, 76 on the input shafts 16, 14 so that the freewheeling synchronizer hubs 26 may freewheel with respect to the shafts 16, 14.

In any case, use of the freewheeling synchronizer 10 may enable faster shifting because selection of both odd and even gear ranges can be carried out with little to no impact on system drag. In contrast, selection of both odd and even gear ranges in a conventional system would necessarily result in higher system drag at least for the time that both odd and even ranges are selected. Such drag in the conventional system may be attributed to forced slip across one or more open clutches in order to select both an odd and even gear range. But use of the freewheeling synchronizer reduces or eliminates the need for forced slip across the clutch(es), thereby reducing or eliminating drag.

The above description of embodiments of the invention is merely illustrative in nature and, thus, variations thereof are not to be regarded as a departure from the spirit and scope of the invention.

What is claimed is:

1. A freewheeling synchronizer for a power transmission device, comprising:

a clutch race having an inner periphery, rotationally fixable at the inner periphery to a component of the power transmission device; the clutch race including an outer periphery with unidirectional clutching elements, the outer periphery configured to support a synchronizer hub;

the synchronizer hub disposed radially outwardly from the clutch race and unidirectionally rotatable relative to the clutch race;

wherein the synchronizer hub includes an outer periphery with at least one pocket with a strut configured to engage both in the pocket and with a first synchronizer ring, the first synchronizer ring configured to frictionally engage a second synchronizer ring, and the strut configured to engage both in the pocket and with a third synchronizer ring, the third synchronizer ring configured to frictionally engage with a fourth synchronizer ring;

wherein a first gear is positioned on one side of the clutch race and a second gear is positioned on a second side of the clutch race and the clutch race is selectively engageable with either the first gear through the first and second synchronizer rings or the second gear through the third and fourth synchronizer rings;

wherein the clutch race includes a splined inner diameter, and an outer ratchet diameter defining a plurality of notches;

further comprising at least one pawl disposed between the clutch race and the synchronizer hub for engagement with the notches of the clutch race;

further comprising at least one spring to urge the at least one pawl into engagement with the notches of the clutch race.

2. A dual clutch transmission comprising:

a first input shaft coupled to a first input clutch;

a second input shaft coupled to a second input clutch;

a first input gear coupled to the first input shaft;

a second input gear coupled to the first shaft;

a counter shaft offset from the input shafts;

a first gear freely rotatable on the counter shaft and in constant mesh with the first input gear;

a second gear freely rotatable on the counter shaft and in constant mesh with the second input gear;

a clutch race rotationally fixable at an inner periphery to a component of the power transmission device; the clutch race including an outer periphery with unidirectional clutching elements, the outer periphery configured to support a synchronizer hub of a synchronizer;

the synchronizer hub disposed radially outwardly from the clutch race and rotatable relative to the clutch race in only one direction;

wherein the synchronizer hub includes an outer periphery with at least one pocket with a strut configured to engage both in the pocket and with a first ring, the first ring configured to frictionally engage a second ring, and the strut configured to engage both in the pocket and with a third ring, the third ring configured to frictionally engage with a fourth ring;

wherein the first gear is positioned on one side of the clutch race and the second gear is positioned on a second side of the clutch race and the clutch race is selectively engageable with either the first gear through the first and second rings or the second gear through the third and fourth rings;

wherein the counter shaft and clutch race are freewheelable relative to the synchronizer hub during a transmission upshift to allow both input clutches to be simultaneously fully applied with the input clutches not slipping during at least part of the transmission upshift so that the counter shaft and the clutch race rotate faster than the synchronizer hub through the unidirectional clutching element;

wherein the synchronizer is configured such that when the first input clutch is transmitting power, a power path of the second input clutch through a given gear may be freely synchronously changed to a different selected gear.

* * * * *